United States Patent [19]

Masaki et al.

[11] Patent Number: 4,495,786
[45] Date of Patent: Jan. 29, 1985

[54] STEERING LOCK FOR AUTOMOTIVE VEHICLES

[75] Inventors: Mikio Masaki; Etuo Nara; Keiichi Shimizu, all of Tokyo; Takeshi Fukasawa, Yokohama, all of Japan

[73] Assignee: Kokusan Kinzoku Kogyo Kabushiki Kaisha, Tokyo, Japan

[21] Appl. No.: 390,865

[22] Filed: Jun. 22, 1982

[51] Int. Cl.³ .................. E05B 17/04; B60R 25/02
[52] U.S. Cl. ............................. 70/186; 70/252; 70/380
[58] Field of Search ............ 70/186, 252, 185, 182, 70/379 R, 380

[56] References Cited

U.S. PATENT DOCUMENTS 4,333,325  6/1982  Morikawa .................. 70/186
4,352,278  10/1982  Neyret .................. 70/252
4,387,582  6/1983  Meunier .................. 70/186

Primary Examiner—Robert L. Wolfe
Attorney, Agent, or Firm—Fleit, Jacobson, Cohn & Price

[57] ABSTRACT

A steering lock for automobiles includes a check lever movable upon rotation of a key-actuated cylinder into locking engagement with a locking rod to lift the latter clear of engagement with a steering shaft. When the key-actuated cylinder is turned back and the key is pulled out, the check lever is pulled back out of locking engagement with the locking rod, which then locks the steering shaft. As the check lever is thus retracted, it depresses a spring-loaded control member into a key slot in the key-actuated cylinder. When the check lever is fully moved back, the spring-loaded control member is pulled out of the key slot. Thus, the key can be inserted smoothly into the key slot for releasing the steering lock.

5 Claims, 15 Drawing Figures

STEERING LOCK FOR AUTOMOTIVE VEHICLES

BACKGROUND OF THE INVENTION

The present invention relates to a steering lock for automotive vehicles.

Known steering locks for use in automotive vehicles include a locking rod movable toward a steering shaft when the ignition key is pulled out of key cylinder as the latter is in a locked position. The steering lock also has a control member movable into and out of a key insertion slot formed in the key cylinder in response to removal and insertion of the ignition key. The control member is retractable out of the key insertion slot when engaged by the ignition key as inserted into the key cylinder. The control member therefore gives resistance to the insertion of the ignition key, preventing the latter from being pushed in smoothly.

SUMMARY OF THE INVENTION

It is an object of the present invention to provide a steering lock which includes a control member that remains out of a key insertion slot for thereby allowing an ignition key to be inserted smoothly into the key insertion slot in a key cylinder.

Another object of the present invention is to provide a steering lock including a retainer pin for preventing removal of a spindle that interconnects a key cylinder and a switch case, so that the steering lock can be prevented from being tampered with by detaching the switch case.

Still another object of the present invention is to provide a steering lock including a frame or housing and a holder mechanism for holding a locking bar, the holder mechanism with the locking bar assembled therein being inserted in the frame through an opening facing towards a steering shaft, whereby the steering lock can easily be assembled and is rendered burglarproof.

A still further object of the present invention is to provide a steering lock having a key cylinder supported between a frame and a housing disposed therein and held against axial movement in the housing, the key cylinder having a circumferential projection engaged in a front opening in the frame so that the key cylinder can be prevented from being tampered with.

A yet further object of the present invention is to provide a steering lock including a switch case so mounted in a frame that the switch case is protected against unauthorized removal for the prevention of tampering with the steering lock.

According to the present invention, a steering lock for an automobile includes a key cylinder rotatably supported in a housing disposed in a frame and having a cam and a locking projection on the circumferential surface, a locking bar movably supported in a holder mounted in the frame and displaceable between a retracted position in which the locking bar is held out of engagement with the steering shaft and a locking position in which the locking bar is held in locking engagement with the steering shaft, a check lever having one end engageable with the cam or the locking projection and the other end engageable with the locking bar to keep the latter in the retracted position, and a control member movably disposed in a radial hole in the key cylinder. The check lever is spring-biased to move in a direction out of engagement with the locking bar, and the control member is spring-biased to move in a direction out of the key insertion slot in the key cylinder. When the ignition key is inserted into the key insertion slot and turned to rotate the key cylinder from an OFF position to ON and START positions, the cam causes the check lever to move against the bias of the spring into engagement with the locking bar which has been displaced into the retracted position by the turning movement of the key cylinder. The check lever is retained in the displaced position by the locking projection. Upon rotation of the key cylinder to the OFF-position and removal of the ignition key out of the key insertion slot, the check lever is spring-biased to move out of locking engagement with the locking bar while at the same time displacing the control member into the key insertion slot. As the end of the check lever is moved back to the cam, the control member returns out of the key insertion slot under the bias of the spring. The locking rod, when disengaged from the check lever, is moved into the locking position under the force of a spring.

The above and other objects, features, and advantages of the present invention will become more apparent from the following detailed description taken in conjunction with the accompanying drawings in which a certain preferred embodiment of the invention is shown by way of an illustrative example.

DETAILED DESCRIPTION OF THE INVENTION

Figure 1:
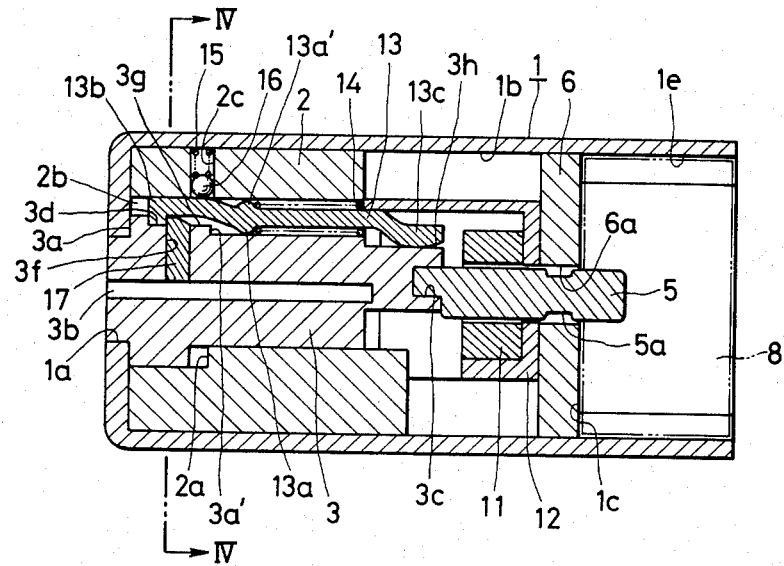
FIG. 1 is a longitudinal and sectional view of a steering lock constructed in accordance with the present invention, shown, however, in its key-off and shaft-locking position.

In FIGS. 1–10, illustrating a preferred embodiment of the inventive automative steering shaft locking and unlocking unit or briefly "steering lock", a hollow unitary housing block or briefly "lock housing" 1 is shown, as comprising a hollow cylindrical element 1A and a hollow, substantially hexagonal element 1B. This composite unitary structure will be most clearly seen from its outline configuration shown in FIG. 6. The common hollow inside space is shown with a reference symbol 1b and opening at its front end at 1a.

Substantially in the front half of the interior space 1b of the lock housing 1 as defined by the hollow cylindrical element 1A, an inside housing case 2 is mounted fixedly, a conventional key cylinder 3 being rotatably mounted therein.

The desired relative unrotational connection between the lock housing 1 and the inside housing case 2 is definitely assured by the provision of two radially and outwardly projection wings 2A and 2B on the member 2, said wings being snugly received in correspondingly shaped longitudinal grooves 1C and 1D formed in the inside wall of the said hollow cylindrical element 1A. The front end of the inside housing case 2 abuts snugly against the inside wall surface of the front end of the lock housing.

The key cylinder is formed at a close proximity of the reduced front end thereof with a radial and peripheral projection 3a which is kept in slidable contact with the inside wall surface of the lock housing 1 around the front opening 1a, thereby the key cylinder being positively prevented from slip-out from the interior space 1b of the lock housing. A partially peripheral projection 3a' is formed on the key cylinder at a distance when seen axially rearwards from the projection 3a, and adapted for establishing a rotatable engagement with an inside stepped wall portion 2a of inside housing case 2, thus avoiding again an axial movement of the key cylinder.

Figure 2:
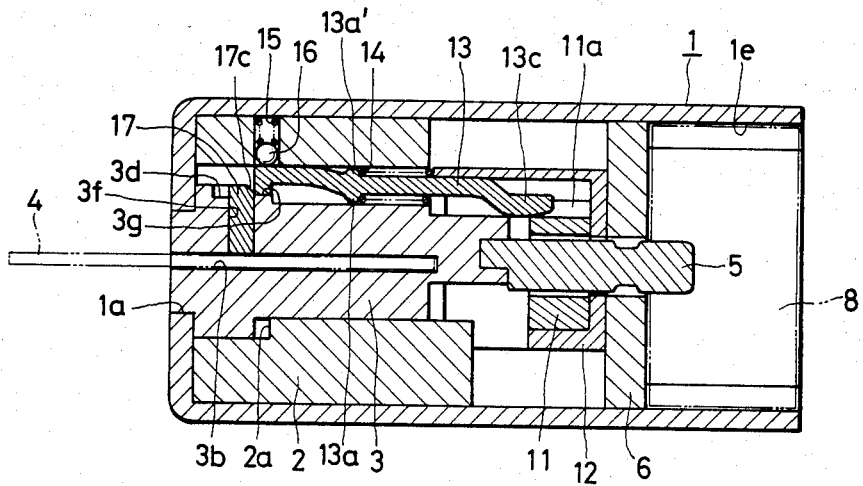
FIG. 2 is a longitudinal and sectional view of the steering lock shown in FIG. 1, shown, however, in its key-inserted, shaft-unlocking position.

Along the longitudinal axis of key cylinder 3, the latter is formed as conventionally with a key-insertion slot 3b for insertion of a key 4 which is shown only imaginarily in FIG. 2. Naturally, there are provided a certain definite number of conventional tumbler pins bridging between the key cylinder 3 and inside housing case 2, although not shown on account of its very popularlity and for avoiding too much complexity of the drawings.

The key cylinder is formed at its rear end with a recess 3c, receiving snugly the reduced and stepped front end of a first axially extending spindle 5 which passes through an opening 6a bored through a closure plate 6 closing in practice the inside space 1b and separating therefrom a rear idle space 1e.

Figure 3:
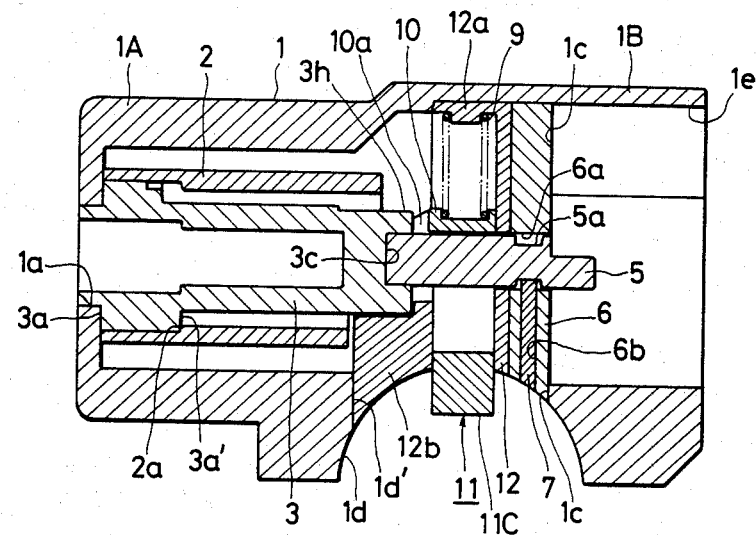
FIG. 3 is a longitudinal and sectional view of the steering lock illustrated in FIG. 1, the sectional plane being taken at right angles to that shown therein.
Figure 6:
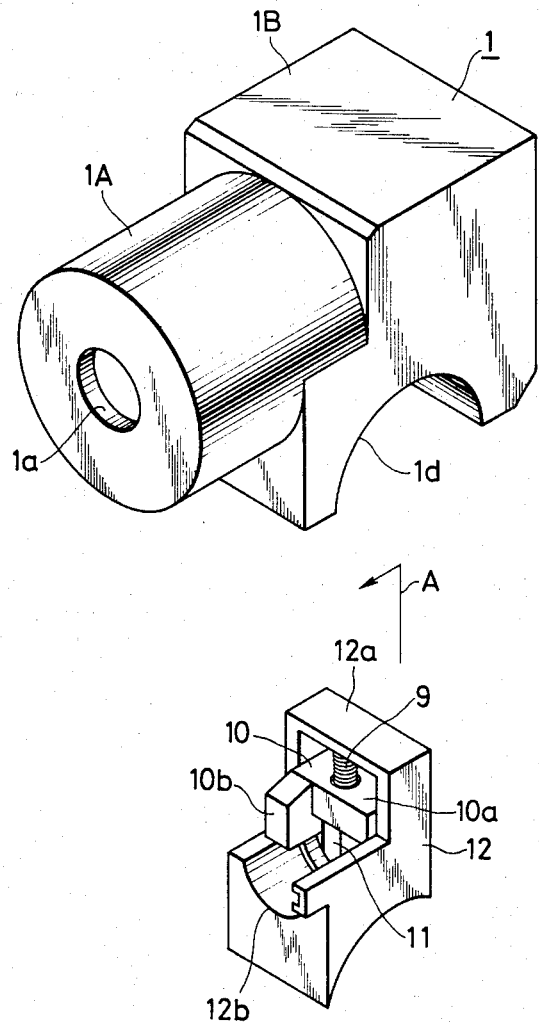
FIG. 6 is an exploded perspective view of the locking bar and the holder as they are just about to be put together.

As most clearly seen from FIGS. 3 and 6, the trapezoidal housing element 1B is formed in its thickened bottom appearing in FIG. 3 with a large lateral semi-circular recess 1d communicating with a cross opening 1d'', the latter being kept in communication in turn with the interior housing space 1b. The recess 1d opens towards the automotive steering shaft, although not shown. The plate 6 is held in fixedly in position in the lock housing 1 by abutting against an inside shoulder 1c formed on the inside wall 1a thereof. Further, the plate 6 is formed with an elongated opening 6b extending nearly half length thereof and between the central bore opening 6a and the arcuated recess 1d. In the elongated opening 6b, there is inserted a second and lateral spindle 7, as seen most clearly from FIG. 3. The length of this second spindle 7 is slightly longer than its holding opening 6b and its inner end is kept in engagement with ring recess 5a formed on the first spindle 5, the latter being thus held rotatable in position, yet however, prevented from axial movement.

When seen in FIG. 3, several related members 6, 7 and 12, the lower ends of all these are so prefabricated that a practical extension of the semi-circular curved surface 1d is formed and provided.

As for the member or more specifically holder 12, it will be described more in detail hereinbelow, together with a slide bar 11 acting as the steering shaft lock control member.

Numeral 8, shown in FIGS. 1 and 2 as fixedly mounted in the rear chamber 1e, represents only schematically a conventional switch case.

Figure 5:
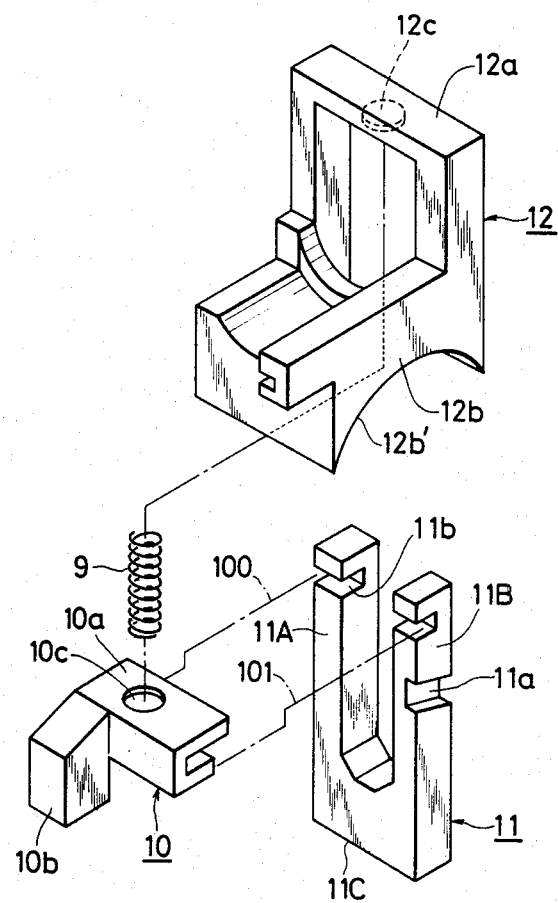
FIG. 5 is an exploded perspective view of a locking bar and holder sub-assembly in the steering lock.

The numeral 11 represents, more specifically, a kind of locking slide which is formed with two parallel motion-receiving arms 11A and 11B and an operating front end 11C, as most clearly be seen from FIG. 5. This slide 11 is movable to-and-fro in the vertical direction when seen in FIGS. 3 and 5 and slidably mounted in a stationary holder 12, the latter being also most clearly seen from FIG. 5. The holder 12 has generally a chair style configuration comprising a top portion 12a and an arc-shaped bottom 12b, the former having an inside recess 12c opening downwards and the latter having an arc-shaped bottom surface 12b'. On the other hand, numeral 10 represents an intermediate piece comprising a channel-shaped main portion 10a and a motion receiving portion 10b made integral with each other. The member 10 is mechanically coupled with the slide 11, as hinted with two explanatory and imaginary chain-dotted lines 100 and 101 shown in FIG. 5. The member 10 is formed with an upwardly opening recess 10c. During the assembly of these three members 10, 11 and 12, so as to provide a steering locking and unlocking mechanism proper, a coil spring 9 is held under compression between the two opposingly positioned spring-mounting recesses 10c and 12c. In its service position, therefore, the locking slide 11 is urged resiliently towards its locking position.

The locking slide is formed as shown in FIG. 5 with an intermediate, substantially horizontally extending recess 11a which is adapted for engagement with a check lever 13 to be described later more in detail.

When assemblying, the subassembly comprising the foregoing four members 9–12 shown in FIG. 5 in their exploded perspective mode and further shown in their subassembled state in FIG. 6 at the lower half thereof, is introduced, in advance of the introduction of closure plate 6 into position, through the lateral opening defined between 1c and 1d', and vertically when seen in FIGS. 3 and 6, and then moved leftwards in FIG. 3 by a small distance substantially equal to the thickness of closure plate 6, so as to bring the said subassembly into its service position shown in FIGS. 1-4. This two-step assemblying procedure is generally suggested by an angular arrow "A" shown in FIG. 6. At this stage, the motion-receiving portion 10b of intermediate member 10 is brought into contact with the actuating end 3h of key cylinder 3. Then, the closure plate 6 is brought into its service position.

Figure 4:
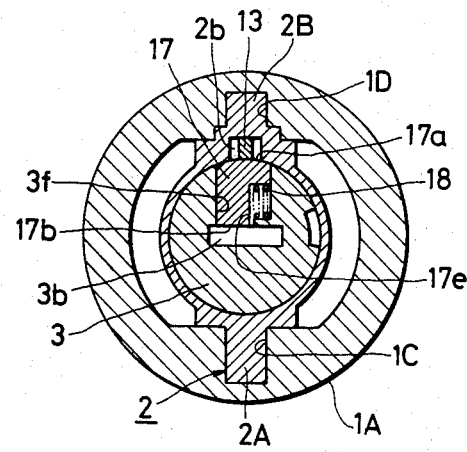
FIG. 4 is a transversal cross-sectional view taken along the line IV—IV shown in FIG. 1.

As may be well seen from FIGS. 1, 2 and 4 in combination, an elongated longitudinal groove 2b is seen which constitutes a holding chamber for the check lever 13 by cooperation with the circumferential surface of key cylinder 3. In the following, thus, this holding chamber will be explained with the same reference symbol 2b. Check lever 13 is mounted slidably in the holding chamber 2b, the former being slightly pivotable about a pair of ridges 13a and 13a' formed at its an intermediate point when seen in its longitudinal direction and practically acting as a common intermediate pivot. The pivotal movement may be carried out on the plane of FIGS. 1 and 2. If necessary, these ridges may be united into one ring projection.

A coil spring 14 is positioned between the ridge 13a' and the holder 12, thereby the check lever 13 being resiliently urged to move frontwards or leftwards in FIGS. 1, 2 and 3. The front end 13b of check lever 13 is formed into a hook adapted for abutting against the inside wall surface of the projection 3a of key cylinder 3, while the rear end 13c of the former is formed into a slowly stepped actuator adapted for engagement with the recess 11a of locking bar 11.

The upper wall portion of inside housing case 2 is laterally bored through at a place in proximity of its front end, so as to provide a lateral opening 2c extending from outside to its inside hollow space. In this lateral opening 2c, a steel ball 16 is movably mounted and backed up by a small compression coil spring 15, thus the former being kept in pressure contact with the forward end portion of check lever 13.

Figure 7:
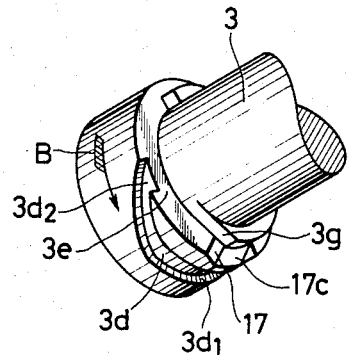
FIG. 7 is a fragmentary perspective view of a key cylinder in the steering lock.
Figure 9:
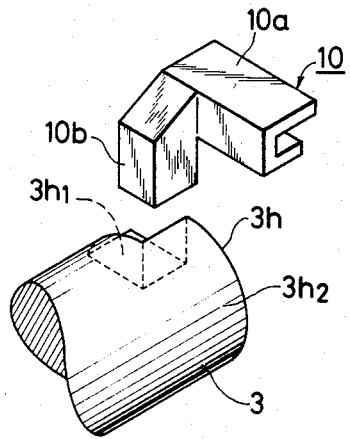
FIG. 9 is a perspective view of the cam portion and the hanger as shown in FIGS. 8(a) through 8(e).
Figure 8:
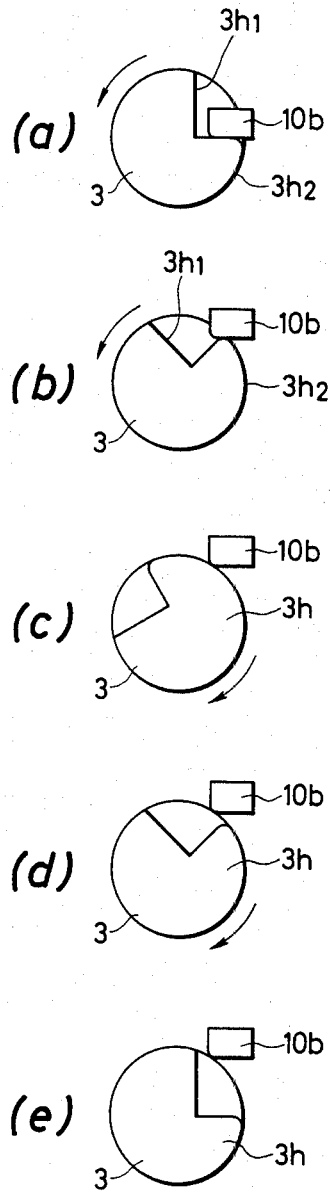
FIGS. 8(a) through 8(e) are schematic views showing progressive steps of engagement between a cam portion of the key cylinder and a hanger in the locking bar.

As may be clearly seen from FIGS. 1, 2, 4 and 7 in combination, and specifically from FIG. 7, at the enlarged front end portion of the key cylinder 3, there is provided an actuating cam arrangement cooperating with the cam follower end of 13b and comprises a cam groove 3d beginning at $3d_1$ and ending at $3d_2$ when the key cylinder is rotated, say 120 degrees in clockwise direction when observed from the front end towards rear end thereof, so as to provide a predetermined longitudinal sliding stroke of the check lever. The cam arrangement further comprises an inclined cam way 3e adapted for generation of a predetermined pivotal motion of the check lever 13, however, without giving the latter any sliding stroke. When the key cylinder is rotated in the reverse direction, the follower end 13b is forced to execute the reversed pivotal motion as well as reversed sliding stroke motion as its return movements. Naturally, both cam elements 3d and 3e are kept in communication with each other at their respective stroke ends.

In close rear proximity of beginning end $3d_1$ of cam groove 3d, the key cylinder is formed with a radial opening 3f extending between key slot and the key cylinder surface, the said opening mounting therein slidably a control member 17, the top or outer end thereof having an inclined surface 17c adapted for cooperation with the front end of check lever 13, so as to let them to act as a kind of auxiliary cam piece and a cam follower, respectively. In the shaft-locking position of the lock unit shown in FIGS. 1, 3 and 4, the top end 17a of control member 17 forms a curved extension of key cylinder surface when seen in the cross-sectional view shown in FIG. 4 and is kept in engagement with the hooked front end 13b of check lever 13 as shown in FIG. 1. In this position, the lower end 17b of control member 17 is prevented from invading into the key slot 3b. Thus, a later frictionless insertion of the key 4 into the key slot is assured. As shown in FIG. 4, the control member 17 is formed at its lower portion with a recess 17e in which a coil spring 18 is positioned so as to resiliently urge the control member 17 for the establishment of lateral pressure contact with inside wall surface of the lateral opening 3f to avoid invasion of the lower end of control member 17 into the key slot 3b.

Referring to FIG. 7, a tapered guide portion 3g is formed on the key cylinder 3, adapted for cooperation with the stepped rear end of check lever 13 and at a close proximity of the beginning end $3d_1$ of cam groove 3d and neighboring with the rear side of control member 17.

Before introduction of the ignition key 4 into the slot 3b, constituent elements of the steering lock unit are positioned as shown in FIGS. 1, 3 and 4.

The operation of the foregoing steering unit is as follows:

In the shaft-locking position wherein the ignition key 4 is out of engagement with the key slot 3b, the check lever 13 is positioned at its frontmost situation, especially shown in FIG. 1, thereby the rearmost operational or camming end 13c of check lever 13 being out of engagement with the motion-receiving groove 11a of locking bar or slide 11. In this case, as shown at (1) of FIG. 8, the driven portion 10b of the hanger or intermediate piece 10 is kept in engagement with a recess $3h_1$ of camming portion 3h of the key cylinder 3, thereby the said hanger or intermediate piece being influence by the spring force at 9 and thus, the locking bar 11 being positioned at its advanced operational or shaft-locking positioned. Although not shown, the operational end of rod 11 is kept in engagement with the conventional, correspondingly shaped receiving slot on the steering shaft, not shown, thus the latter being locked positively against turning.

When the vehicle driver introduces his ignition key 4 into the key slot 3b for turning of the key cylinder 3, the check lever 13 is driven rearwards a certain distance by the operating engagement of the cam portion 3d with motion-receiving projection 13b, and at the same time, the hanger 10 and rod 11 is caused to move back from its shaft-locking position under the action of cam portion 3h upon the driven portion 10b, thereby the latter bring brought onto the circumferential surface $3h_2$. At the thus attained "ACCESSORY"-position of the key, the engageable portion 13b of check lever 13 is brought into engagement with cam way 3e and at the same time, the portion 13c is brought into engagement with the cooperable slot 11a, thereby the locking bar being kept in its unlocking position (refer to (2) at FIG. 8).

Continued turning movement of the key cylinder 3 from an ON position to a START position (to the position of FIG. 8(c)) causes the spindle 5 to change electrical contacts in the switch case 8.

When the key cylinder 3 is turned back to the initial locking position, the locking projection 13b of the check lever 13 moves along the locking step 3e and is raised by the tapered guide face 3g toward a position rearward of the control member 17 as shown in FIG. 2, with the cam follower 10a being displaced with respect to the cam 3h as shown in FIGS. 8(c) through 8(e). When the key 4 is pulled out of the key insertion slot 3b, the locking projection 13b of the check lever 13 rides over the control member 17 via the tapered guide face 17c as the control member 17 is depressed, and then is finally brought past the control member 17 into the end $3d_1$ of the cam slot 3d. Such movement of the locking projection 13b is caused by the force stored in the spring 14 which is stronger than the spring 18. As the check lever 13 is thus advanced, the rear end 13c thereof is pulled out of the locking recess 11a in the locking rod 11. At this time, the cam follower 10a of the hanger 10 is located in alignment with the cam recess $3h_1$ as shown in FIG. 8(e). Therefore, the locking rod 11 is allowed by the spring 9 to move toward the locking position with the cam follower 10a received in the cam recess $3h_1$ as shown in FIGS. 1 and 8(a) under the resilience of the spring 9.

Figure 10:
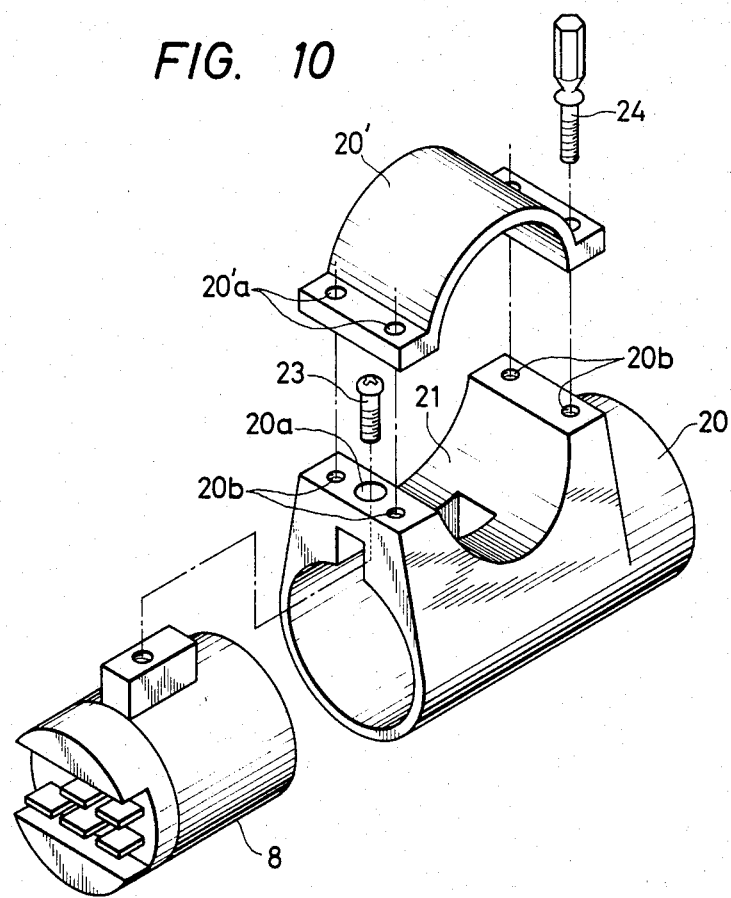
FIG. 10 is an exploded perspective view of a switch case and a frame of the steering lock.
Figure 11:
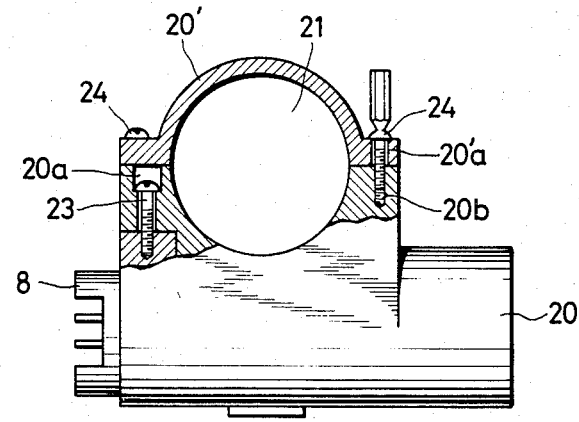
FIG. 11 is a side elevational view, partly in cross section, of the frame with the switch case mounted therein.

As shown in FIGS. 10 and 11, a cylindrical frame 20 of a steering lock according to the present invention includes therein a housing, a key cylinder, and a locking bar (not shown), which are of the same construction as that described above. However, in the present modification, the frame 20 corresponds to that shown in the foregoing embodiment represents a rather simplified and practical general configuration. The locking bar is actuated by the key cylinder so as to move into or out of a space 21 in which a steering shaft (not shown) is accommodated. The space 21 is defined between the frame 20 and a fixer frame 20'. The frame 20 contains a switch case 8 in an end portion thereof which is opposite to that in which the housing and key cylinder are received. The switch case 8 is fixed in position by a screw 23 extending through an attachment hole 20a threadedly into the switch case. With the switch case 8 thus attached, the fixer frame 20' is placed over the factened screw 23 and secured to the frame 20 by fixer bolts 24 threaded through holes 20'a in the fixer frame 20' into threaded holes 20b in the frame 20.

With the arrangement of the present invention, the control member which is responsive to movement of the key cylinder remains out of the key insertion slot when the key is inserted into the key cylinder, so that the key can be inserted smoothly without being subjected to undue resistance.

The steering lock is rendered burglaproof by the holder and the plate which close the large-diameter opening in the frame. The steering lock can easily be assembled since the switch case is coupled to the spindle which has been inserted into the key cylinder through the hole in the plate fixedly mounted in the frame.

With the key cylinder securely housed in the frame, the key cylinder cannot be pried or otherwise tampered with at the front end of the frame.

In assembly, the locking rod is first placed in the holder, and the assembly is then inserted into the frame through the opening therein facing the steering shaft. The steering lock can thus be easily assembled. The opening through which parts are inserted is finally closed off by the assembled parts, so that the steering lock is rendered burglarproof at the opening.

The spindle which interconnects the key cylinder and the switch case is prevented by the spindle pin from being forced out. The spindle pin is inserted through the opening which faces the steering shaft and which is eventually closed off. Thus, the spindle pin can easily be placed in position and cannot be removed once the steering lock is installed on the steering shaft.

After the steering shaft is mounted on the frame, the switch case cannot be detached and hence is prevented from being tampered with.

Although a certain preferred embodiment of the present invention has been shown and described in detail, it should be understood that many changes and modifications may be made therein without departing from the scope of the appended claims.

The embodiments of the invention in which an exclusive property or privilege is claimed are as follows:

1. A steering lock for an automobile having a steering shaft, comprising:
   a frame;
   a key cylinder rotatably mounted in said frame and having at one end thereof a cam, a locking step, and a radial slot, said key cylinder including a key insertion slot;
   a check lever mounted axially movable on said key cylinder and having one end engageable with said cam or said locking step;
   a locking rod movably supported in said frame and movable between a retracted position in which the locking rod is held out of locking engagement with the steering shaft and a locking position in which the locking rod is held in locking engagement with the steering shaft, said check lever having the other end engageable with said locking rod to keep the latter in said retracted position;
   a first spring for normally urging said check lever to move in a direction to disengage the latter from said locking rod;
   a central member slidably disposed in said radial slot;
   said check lever being axially movable in a first direction in response to rotation of said key cylinder with a key inserted in said key insertion slot for causing said cam to displace said one end of the check lever toward said locking step until said other end engages said locking rod to keep the latter in said retracted position; and
   said check lever being axially movable in a second direction opposite to said first direction in response to removal of the key out of said key insertion slot for returning said one end toward said cam while depressing said control member into said key insertion slot, whereby said other end of the check lever can be disengaged from said locking rod to allow the latter to move into said locking position.

2. A steering lock for an automobile having a steering shaft, comprising:
   a frame;
   a key cylinder rotatably mounted in said frame and having at one end thereof a cam, a locking step, and a radial slot, said key cylinder including a key insertion slot;
   a check lever mounted axially movably on said key cylinder and having one end engageable with said cam or said locking step;
   a locking rod movably supported in said frame and movable between a retracted position in which the locking rod is held out of locking engagement with the steering shaft and a locking position in which the locking rod is held in locking engagement with the steering shaft, said check lever having the other end engageable with said locking rod to keep the latter in said retracted position;
   a first spring for normally urging said check lever to move in a direction to disengage the latter from said locking rod;
   a control member slidably disposed in said radial slot;
   said check lever being axially movable in a first direction in response to rotation of said key cylinder with a key inserted in said key insertion slot for causing said cam to displace said one end of the check lever toward said locking step until said other end engages said locking rod to keep the latter in said retracted position;
   said check lever being axially movable in a second direction opposite to said first direction in response to removal of the key out of said key insertion slot for returning said one end toward said cam while depressing said control member into said key insertion slot, whereby said other end of the check lever can be disengaged from said locking rod to allow the latter to move into said locking position; and a holder mounted in said frame and supporting said locking rod, a plate mounted in said frame and having a hole, said frame having a pair of adjacent openings accommodating and closed by said holder and said plate, respectively, a switch case mounted in said frame, said key cylinder and said switch case being positioned one on each side of said plate, and a spindle extending through said hole in said plate and interconnecting said key cylinder and said switch case operatively.

3. A steering lock according to claim 2, said frame having a third opening which is smaller in diameter that one of said adjacent openings, including a housing mounted in said frame and supporting said key cylinder, said key cylinder having a pair of first and second circumferential steps, said first circumferential step being engaged in said third opening, said housing having an annular step with which said second circumferential step is held in engagement, said third opening being located at one end of said frame and said second opening being located at the other end of said frame.

4. A steering lock according to claim 2, said holder having a pair of first and second portions spaced from each other, said first portion closing one of said adjacent openings, including second spring acting between said second portion of said holder and said locking rod for normally urging the latter to move into said locking position, said holder being insertable into said frame through said one of the adjacent openings during assembly.

5. A steering lock according to claim 2, said plate having an aperture opening toward the steering shaft and leading to said hole, said spindle having an annular groove, including a spindle pin inserted through said aperture lockingly into said annular groove.

* * * * *